United States Patent Office 3,492,297
Patented Jan. 27, 1970

3,492,297
GUANIDINO CEPHALOSPORINS
Burton G. Christensen, Scotch Plains, N.J., assignor to Merck & Co., Inc., Rahway, N.J., a corporation of New Jersey
No Drawing. Filed July 1, 1965, Ser. No. 468,925
Int. Cl. C07d 65/04, 99/04; A61k 21/00
U.S. Cl. 260—243          12 Claims

ABSTRACT OF THE DISCLOSURE

Novel 7-guanidino acylamino cephalosporin compounds, useful as antibiotic agents.

---

This invention relates to new antibiotic compounds and methods of preparing them.

More particularly, it is concerned with new cephalosporins, esters and salts thereof, and with methods for preparing these products.

Still more particularly, it relates to new cephalosporin compounds having a guanidino radical incorporated as a substituent in the cephalosporin molecule.

The antibiotic substance, cephalosporin, is a fermentation-produced mixture of material which is composed of a number of different substances. One of these substances, cephalosporin C, has been described in the prior art and its structure elucidated. This cephalosporin C antibiotic is active against gram-positive bacteria. The substance cephalosporin C has the following structural formula:

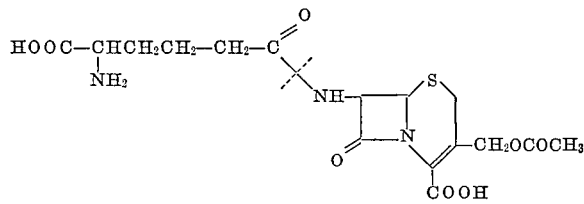

On acid treatment, the molecule may be hydrolytically cleaved into the fragments indicated by the dotted line in the formula. One of these fragments is α-aminoadipic acid and the other fragment of the molecule is a bicyclic heterocycle known as 7-aminocephalosporanic acid, which has the formula:

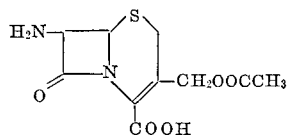

In addition to the cephalosporin C depicted above, a number of derivatives of cephalosporin are known in which the α-aminoadipic acid side chain is replaced by other acyl substituents. Certain of these derivatives of 7-aminocephalosporanic acid are active broad spectrum antibiotics which are useful in the treatment of both gram-positive and gram-negative bacterial infections. Notable among these cephalosporin compounds is one known as cephalothin, chemically identified as the sodium salt of 7-(thiophene-2-acetamido)cephalosporanic acid.

One of the drawbacks of this and other cephalosporin compounds, along with other antibiotics such as the penicillins which act in a similar manner against infectious microorganisms is the limitation in therapy which arises from the fact that the drugs are not absorbed following oral administration. Thus, these prior art materials, particularly the cephalosporins, are not useful in the routine oral therapy of systemic infections but must be administered intramuscularly or intravenously.

It is therefore an object of the present invention to provide novel acylated derivatives of 7-aminocephalosporanic acid having enhanced activity as compared to previously-known cephalosporins.

It is a further object of this invention to provide acyl derivatives of 7-aminocephalosporanic acid having a guanidino substituent replacing one of the hydrogens of the cephalosporin compound.

A further object of the invention is to provide processes for the preparation and recovery of these guanidinoacylamidocephalosporanic acid compounds.

These, along with other objects which will be apparent from the following detailed description of the invention, are set forth below.

In accordance with the present invention, it has been found that derivatives of 7-aminocephalosporanic acid having enhanced antibiotic activity are provided by the introduction of a guanidino substituent into the cephalosporin molecule. These compounds are prepared by the acylation of 7-aminocephalosporanic acid or its derivatives with guanidino organic acids or acid halides. These new guanidinoacylamidocephalosporanic acids have been found to have enhanced antibacterial activity as compared to known cephalosporins and, in addition, these materials have been found to be effective against systemic infections when administered via the oral route as well as by intravenous or intramuscular injection.

These new cephalosporins, with which the present invention is concerned, are represented by the following formula:

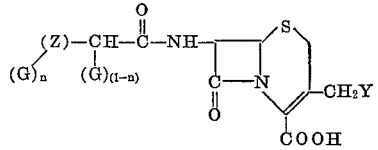

wherein Z depicts a loweralkyl radical, an aryl radical or a heterocyclic radical, G is a guanidino radical n is either 0 or 1, and Y is acetoxy, a pyridinium ion, or an isothiouronium radical. Thus, the guanidino radical may be attached to the side chain of the cephalosporin molecule at the alpha position relative to the amide linkage or attached to the aryl or heterocyclic ring. One of the preferred classes of new cephalosporins of the present invention is 7 - (α - guanidinoacetamido)cephalosporanic acids and derivatives wherein the carbon bearing the guanidino substituent is further substituted by an alkyl substituent, and aryl radical or a 5- or 6-membered heterocyclic ring containing nitrogen, sulfur or oxygen. Particularly preferred in this group are the compounds 7 - (α - guanidinophenylacetamido)cephalosporanic acid and 7 - (α - guanidino - 2 - thienylacetamido)cephalosporanic acid. Another preferred group of new caphalosporins are those in which the guanidino radical is attached to the aryl nucleus of the side chain substituent. An example of this class is 7 - (p-guanidino - phenylacetamido)cephalosporanic acid. These new cephalosporins may be used in therapy as the free acid or may be converted to non-toxic addition salts such as the hydrochloride and the like.

The new cephalosporins of the present invention are prepared in accordance with one method of the present invention by reacting a suitable ester of 7 - aminocephalosporanic acid with a guanidino-substituted acetic acid which may bear other substituents attached to the guanidino-substituted carbon to produce the corresponding ester of the 7 - (α - guanidinoacetamido)cephalosporanic acid and then removing the ester grouping to obtain the desired free 7 - (α - guanidinoacetamido)cephalosporanic acid. Alternatively, the new cephalosporanic acid esters may be used as antibacterial agents without conversion to the cephalosporanic acid or salt thereof by hydrogenation.

Esters of 7-aminocephalosporanic acid suitable for use in carrying out the processes of this invention are those which can be readily cleaved by catalytic hydrogenation. Suitable esters of 7-aminocephalosporanic acid that might be mentioned include the allyl, the benzyl, the diphenylmethyl esters, and the like.

Although the process has been described for the preparation of the 7-(α-guanidinoacetamido)cephalosporanic acids it can be likewise applied to the preparation of the 7-(p-guanidinophenylacetamido)cephalosporanic acids by using the appropriately-substituted p-guanidinophenylacetic acid as the acylating agent in place of the guanidinoacetic acid employed in the process described above.

In an alternative method of carrying out the process of the present invention, the guanidinoarylacetamidocephalosporanic acid, e.g., 7-(p-guanidinophenylacetamido)cephalosporanic acid can be prepared in a more direct method of operation. Thus, 7-aminocephalosporanic acid may be acylated using the acid halide of p-guanidinophenylacetic acid in the presence of an excess of an organic base. This method of operation avoids the step of intermediately isolating the ester of the guanidino-substituted cephalosporin and the step of catalytic hydrogenolysis of the ester to produce the free cephalosporin. Following the acylation reaction, the product is readily recovered by neutralization of the reaction mixture, precipitation of the material from solution by the addition of an organic solvent such as ether, and recrystallization from water.

In accordance with the present invention, the first step in the process is effected by esterifying 7-aminocephalosporanic acid or a salt thereof to obtain a 7-aminocephalosporanic acid ester. In one method of esterification, the 7-aminocephalosporanic acid is contacted with a diazo compound such as a diazoalkane or a diazoaralkane, e.g., diazomethane, diazoethane or phenyldiazomethane in the presence of an inert solvent or liquid diluent for the reacting species to produce the desired 7-aminocephalosporanic acid ester.

In one method of preparing the 7-aminocephalosporanic acid ester, a solution of 7-aminocephalosporanic acid is contacted with an equimolar amount of an organic halo compound, preferably in the presence of a hydrogen ion acceptor such as a tertiary amine, for example, triethylamine, pyridine, and the like. Thus 7-aminocephalosporanic acid is reacted with an organic halo compound such as allyl bromide, benzyl bromide or the corresponding chlorides and iodides. The products formed are the corresponding allyl or benzyl esters of 7-aminocephalosporanic acid. These cephalosporanic acid esters may also be prepared by the direct esterification of 7-aminocephalosporanic acid and the desired alcohol. Thus, reaction of 7-aminocephalosporanic acid with benzyl alcohol or allyl alcohol produces the corresponding benzyl or allyl ester of 7-aminocephalosporanic acid.

The guanidino organic acids used as acylating agents in the preparation of the new cephalosporins of the present invention have the formula:

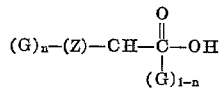

wherein Z is a loweralkyl, a phenyl radical or a 5- or 6-membered heterocyclic ring containing nitrogen, oxygen or sulfur, G is guanidino radical, and $n$ is either 0 or 1.

In preparing the guanidino-substituted carboxylic acids depicted above, the appropriate aminocarboxylic acid is reacted with a selected o-alkylisourea, a s-alkylisothiontrourea followed by hydrogenation, or an isothiourea alkyl ether, and the resulting guanidinocarboxylic acid recovered from the reaction mixture. By this method, α-guanidinophenylacetic acid is prepared by the reaction of α-aminophenylacetic acid with o-methylisourea and p-guanidinophenylacetic acid is prepared by the reaction of p-aminophenylacetic acid with s-methylisothiontrourea followed by reduction. In similar manner, α-guanidino-(3-thienyl)acetic acid is prepared by the reaction of α-(3-thienyl)aminoacetic acid with o-methylisourea hydrochloride; α-guanidino-(2-thienyl)acetic acid is prepared by the reaction of α-(2-thienyl)aminoacetic acid with o-methylisourea hydrochloride.

The reaction of the 7-aminocephalosporanic acid ester and the α-guanidino-substituted organic acid is conveniently carried out by contacting the reactants in the presence of a carbodiimide such as 1,3-dicyclohexylcarbodiimide or 1,3-diazopropyldiimide in the presence of a suitable solvent at room temperature. After completion of the reaction, the urea formed from the carbodiimide is separated from the reaction mixture and the desired cephalosporin ester is recovered from the resulting solution in accordance with methods used for the recovery of analogous compounds such as precipitation with organic solvents such as ether and subsequent recrystallization from water.

The ester of the new cephalosporins so obtained is readily converted to the free acid by catalytic hydrogenation. This catalytic hydrogenation is preferably carried out using a noble metal catalyst such as palladium, platinum or rhodium, preferably supported on an inert carrier such as carbon, barium carbonate, diatomaceous earth, and the like. After completion of the hydrogenation, the free acylated cephalosporanic acid is recovered from the hydrogenation reaction mixture by procedures well known in the art.

The following examples are provided as illustrations of the methods used in preparing the new acylated cephalosporanic acids, but are not necessarily limitative of the invention, which is defined in the appended claims.

EXAMPLE 1

Preparation of 7-(p-guanidinophenylacetamido)cephalosporanic acid

A suspension of 87 mg. of 7-aminocephalosporanic acid in 2.0 ml. of anhydrous dimethylformamide is stirred in an ice bath and 0.091 ml. of dry triethylamine is added. After stirring for approximately 30 minutes, 89 mg. of p-guanidinophenylacetylchloride hydrochloride is added. The reaction mixture which contains the product is stirred for 1 hour at 0° and then warmed to room temperature for approximately 25 minutes before filtering. The filtrate containing the product is diluted with anhydrous ether to precipitate the product as a gum. The filtrate is then decanted from the gum which comprises 7-(p-guanidinophenylacetamido)cephalosporanic acid and the residual gummy material is triturated with ether. The solid material obtained in this manner is crystallized from water to produce the product in substantially pure form.

EXAMPLE 2

Preparation of D-7-(α-guanidinophenylacetamido)cephalosporanic acid

To a solution of 3.0 g. of benzyl-7-aminocephalosporanate and 2.5 g. of dicyclohexylcarbodiimide in 30 ml. of methylene chloride is added dropwise with stirring a solution of 2.3 g. of D-α-guanidinophenylacetic acid hydrochloride in 10 ml. of dimethylformamide during a period of 5 minutes. After standing at room temperature for 30 minutes the solution is cooled and the precipitate of dicyclohexylurea filtered off. The filtrate is diluted with 500 ml. of ether and the supernatant liquid decanted from the precipitated gum. Another 250 ml. of ether is added to the gum which is then rubbed with a spatula until it solidifies. The solid benzyl-D-7-(α-guanidinophenylacetamido)cephalosporanate hydrochloride is filtered off and washed with ether. This is used in the reduction step without further purification.

The benzyl-7-aminocephalosporanate is prepared as follows: Finely ground 7-aminocephalosporanic acid (2 g.) is added to a solution of 1 g. of phenyldiazomethane in 10 ml. of methylene chloride and 3 ml. of methanol. The suspension is stirred for 3 hours during which nitrogen is evolved and the initially red solution decolorizes. The mixture is diluted with 30 ml. of ether and unreacted 7-aminocephalosporanic acid filtered off. To the filtrate is added an hydrous solution of hydrogen chloride in ether dropwise until further addition gives no more precipitate. The precipitated benzyl-7-aminocephalosporanate hydrochloride (2.2 g.) is filtered off and washed with ether. The precipitate is shaken with 30 ml. of ether and a slight excess of aqueous sodium bicarbonate solution and the ethereal layer separated and dried over anhydrous magnesium sulfate. Evaporation of the ether leaves a residue of benzyl-7-aminocephalosporanate.

The D-α-guanidinophenylacetic acid hydrochloride is prepared as follows: 10 g. of D-α-aminophenylacetic acid is dissolved in 200 ml. of water and 60 ml. of 28% aqueous ammonia. Twenty grams of o-methylisourea ether hydrochloride is added and the solution allowed to stand at room temperature for 24 hours. The precipitate of D-α-guanidinophenylacetic acid is filtered off and washed with water. Yield 2.5 g.; M.P. 255° C., solidifies and remelts at about 260° C. with decomposition.

The hydrochloride salt is prepared by dissolving the acid in dilute hydrochloric acid and evaporating the solvent in vacuo. M.P. 157–9° C. with decomposition.

Benzyl - D - 7 - (α-guanidinophenylacetamido)cephalosporanate ester hydrochloride (0.41 g.) is added to a prereduced suspension of 0.1 g. of 10% palladium on charcoal in 10 ml. of 50% methanol and the mixture shaken under hydrogen at room temperature and atmospheric pressure for 45 minutes. The catalyst is filtered off and the filtrate evaporated under reduced pressure. As the methanol evaporates, the product crystallizes out of the aqueous acid solution as the inner salt. The precipitation is completed by the addition of 1 ml. of 0.5 N aqueous sodium bicarbonate solution. The precipitate is filtered off, washed with water and with ethanol.

EXAMPLE 3

Preparation of 7-(guanidinoacetamido)cephalosporanic acid

Benzyl - 7 - (guanidinoacetamido)cephalosporanate hydrochloride is prepared as follows: A solution of 0.464 g. of guanidinoacetic acid hydrochloride in 3 ml. of dimethylformamide is added to a solution of 0.92 g. of benzyl-7-aminocephalosporanate and 0.7 g. of dicyclohexylcarbodiimide in 2 ml. of dimethylformamide. After standing for 20 minutes, the mixture is cooled and the precipitate of dicyclohexylurea is filtered off. The addition of ether to the filtrate as in Example 2 yields 1.2 g. of benzyl - 7-(guanidinoacetamido)cephalosporanate hydrochloride.

A solution of 0.886 g. of benzyl-7-(guanidino-acetamido)cephalosporanate hydrochloride in 20 ml. of 90% aqueous methanol is hydrogenated in the presence of 0.4 g. of 10% palladium on carbon catalyst for 2 hours. After filtration of the catalyst, the filtrate is neutralized with sodium bicarbonate solution, then frozen and lyophilized. The solid residue which contains 7-(guanidinoacetamido)cephalosporanic acid inhibits *Staphylococcus aureus*.

EXAMPLE 4

Preparation of 7-(4-guanidinonaphthylacetamido)cephalosporanic acid

A solution of 4-guanidinonaphthylacetyl chloride hydrochloride (0.56 g.) in 2 ml. of dimethylformamide is slowly added to a solution of 7-aminocephalosporanic acid (0.6 g.) in 5 ml. dimethylformamide at ice-bath temperature. The mixture is stirred ½ hour at 0–5° and ½ hour at room temperature and filtered. The filtrate is diluted with ether and the product triturated several times with ether to give 7-(4-guanidinonaphthylacetamino)-cephalosporanic acid.

The 4-guanidinonaphthylacetyl chloride hydrochloride is prepared from the reaction of benzoyl cyanamide with 4-aminonaphthylacetic acid, followed by basic hydrolysis and reaction of the resulting guanidino acid with thienyl chloride.

EXAMPLE 5

Preparation of 7-(α-guanidino-2-thienylacetamido)-cephalosporanic acid

A mixture of 1 mole of α-(2-thienyl)aminoacetic acid, 2 moles of s-methylisothiourea sulfate and a solution of 440 ml. of concentrated ammonia in 2 liters of water is stirred vigorously for a period of about 16 hours to form α-guanidino-α-(2 - thienyl)acetic acid which crystallizes from solution. The crystalline product is collected by filtration, washed with water and dried.

The α-guanidino-α-(2-thienyl)acetic acid is disholved in dilute aqueous hydrochloric acid and the formed hydrochloride salt of α-guanidino-α-(2-thienyl)acetic acid is recovered as a residue by evaporation of the water and unreacted hydrogen chloride in vacuum.

To a solution of 1 mole of dicyclohexylcarbodiimide in a mixture of methylene chloride and dimethylformamide is added 1 mole of the hydrochloride salt of α-guanidino-2-thienylacetic acid and 1 mole of benzyl-7-aminocephalosporanate. The mixture is stirred at 25° C. for approximately 1 hour and the dicyclohexylurea which forms as an insoluble by-product is removed by filtration. The benzyl-7-(α - guanidino-2-thienylacetamido)cephalosporanate hydrochloride remaining in the filtrate is precipitated by the addition of ethyl ether and the precipitated product recovered by filtration and dried.

A solution of the hydrochloride of the cephalosporin benzyl ester in 80% aqueous methanol is hyrogenated at 25° C. at atmospheric pressure in the presence of 10% palladium on charcoal catalyst. The catalyst is then removed from the solution by filtration and the filtrate neutralized with 1 equivalent of sodium bicarbonate solution. The solution is concentrated in vacuo in order to precipitate the product, 7-(α-guanidino-2-thienyl-acetamido)cephalosporanic acid, from solution.

EXAMPLE 6

Preparation of 3-pyridinium-3-deacetoxy-7-(p-guanidinophenylacetamino)cephalosporanic acid Benzyl 7-aminocephalosporanate hydrochloride (1.0 g.) is dissolved in 50 ml. of water and 3.8 ml. of pyridine is added. The mixture is maintained at 37° C. for 2 days. At the end of this time the solution is lyophilized and the residue triturated with 50 ml. of acetone and redried.

Equimolar portions of the above-prepared benzyl 3-pyridinium-3-deacetoxy-7-aminocephalosporanate and p-guanidinophenylacetylchloride hydrochloride are stirred in anhydrous dimethylformamide for 2 hours at room temperature and the dimethylformamide concentrated in vacuo. The solid which can be triturated with ether is essentially pure benzyl 3-pyridinium-3-deacetoxy-7-(p-guanidinophenylacetamino)cephalosporanate.

The final product is obtained by hydrogenation using an excess of Pd/BaCO$_3$—5% in MeOH:H$_2$O (1:1). The catalyst is removed by filtration and the solvent removed in vacuo. The resulting 3-pyridinium-3-deacetoxy-7-(p-guanidinophenylacetamido)cephalosporanic acid can be crystallized from acetone-water.

EXAMPLE 7

Preparation of the 3-thiouronium salt of 3-deacetoxy-7-(p-guanidinophenylacetamido)cephalosporanic acid Benzyl 7-aminocephanosporanate hydrochloride (15 g.) together with 8 g. of thiourea are dissolved in water and allowed to stand at 37° for several days. The resulting solution is treated with acetone and gives the crude thiouronium salt. Methanol extraction affords a further purification.

A dimethylformamide suspension of equimolar amounts of the above thiouronium salt and p-guanidinophenylacetylchloride hydrochloride is stirred for several hours at room temperature. Removal of the dimethylformamide and ether trituration of the residue affords the 3-thiouronium salt of benzyl 3-deacetoxy-7-(p-guanidinophenylacetamido)cephalosporanate.

Hydrogenolysis is effected by an excess of Pd/10% BaSO₄ in MeOH:H₂O (1:1). After removal of the catalyst by filtration and concentration, the 3-thiouronium salt of 3 - deacetoxy - 7 - (p-guanidinophenylacetamido)-cephalosporanic acid is obtained.

EXAMPLE 8

Preparation of 3-pyridinium-3-deacetoxy-7-(p-guanidinophenylacetamido)cephalosporanic acid In an analogous fashion equivalent amounts of 3-pyridinium methyl-7-aminodecephalosporanic acid inner salt are employed in place of 7-aminocephalosporanic acid in the procedure of Example 1 and there is thus obtained upon completion of the step therein described the compound 3-pyridiniummethyl - 7 - (p-guanidinophenylacetamido)decephalosporanic acid hydrochloride.

EXAMPLE 9

Preparation of 3-thiouronium derivative of 7-(p-guanidinophenylacetamido)cephalosporanic acid 7 - (p-guanidinophenylacetamido)cephalosporanic acid (70 mg.) together with thiourea (130 mg.) are dissolved in distilled water and allowed to stand in the absence of light at 37° for several days. After concentration, the material is washed with acetone and ether to give a white solid.

What is claimed is:
1. A cephalosporin compound of the formula

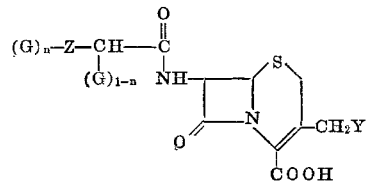

wherein G is a guanidino substituent replacing hydrogen; n is 0 or 1; Z is a loweralkyl radical, phenyl or thienyl; Y is acetoxy, pyridinium or isothiouronium; and the phenyl loweralkyl, diphenyl loweralkyl and loweralkyl esters, and nontoxic salts thereof.

2. 3-pyridinium - 3 - deacetoxy-7-(p-guanidinophenylacetamido)cephalosporanic acid.

3. 7 - (p - guanidinophenylacetamido)cephalosporanic acid.

4. 3-isothiouronium - 3 - deacetoxy-7-(p-guanidinophenylacetamido)cephalosporanic acid.

5. 3-pyridinium - 3 - deacetoxy-7-(α-guanidinophenylacetamido)caphalosporanic acid.

6. 7 - (α - guanidinophenylacetamido)cephalosporanic acid.

7. 3-isothiouronium - 3 - deacetoxy-7-(α-guanidinophenylacetamido)cephalosporanic acid.

8. 7-(guanidinoacetamido)cephalosporanic acid.

9. 7 - (4 - guanidinonaphthylacetamido)cephalosporanic acid.

10. 3-pyridinium - 3 - deacetoxy-7-(α-guanidino-2-thienylacetamido)cephalosporanic acid.

11. 7-(α-guanidino - 2 - thienylacetamido)cephalosporanic acid.

12. 3-isothiouronium - 3 - deacetoxy-7-(α-guanidino-2-thienylacetamido)cephalosporanic acid.

References Cited

UNITED STATES PATENTS 3,252,973  5/1966  Flynn _____ 260—239.1
3,406,185  10/1968  Patchett et al. _____ 260—239.1

FOREIGN PATENTS 982,252  2/1965  Great Britain.

NICHOLAS S. RIZZO, Primary Examiner

U.S. Cl. X.R.

260—999